(12) United States Patent
Dos Remedios

(10) Patent No.: US 7,415,598 B2
(45) Date of Patent: Aug. 19, 2008

(54) MESSAGE SYNCHRONIZATION IN NETWORK PROCESSORS

(75) Inventor: Alwyn Dos Remedios, Markham (CA)

(73) Assignee: Intel Corporation, Santa Clara, CA (US)

( * ) Notice: Subject to any disclaimer, the term of this patent is extended or adjusted under 35 U.S.C. 154(b) by 994 days.

(21) Appl. No.: 10/640,883

(22) Filed: Aug. 13, 2003

(65) Prior Publication Data

US 2005/0038951 A1 Feb. 17, 2005

(51) Int. Cl.
*G06F 13/00* (2006.01)

(52) U.S. Cl. ...................... 712/220; 709/251

(58) Field of Classification Search ................ 712/220; 709/213, 220, 207, 206, 204, 214, 251
See application file for complete search history.

(56) References Cited

U.S. PATENT DOCUMENTS

| 6,625,689 | B2 * | 9/2003 | Narad et al. ................ 711/110 |
| 6,996,639 | B2 * | 2/2006 | Narad ........................ 710/52 |
| 7,039,054 | B2 * | 5/2006 | Narad et al. ................ 370/392 |

\* cited by examiner

*Primary Examiner*—Eric Coleman
(74) *Attorney, Agent, or Firm*—Fish & Richardson P.C.

(57) ABSTRACT

Message synchronization in network processors includes passing data from a producer processor to an inter-processor ring structure, while setting a bit in a register and reading the register by a consumer processor, while clearing the register. Messages are passed by removing data from the ring with the amount of data removed from the ring corresponding to a number of bits set in the register.

41 Claims, 10 Drawing Sheets

MESSAGE SYNCHRONIZATION IN NETWORK PROCESSORS

BACKGROUND

This invention relates to message synchronization between multiple processors.

It is often necessary to synchronize messages passing between processors. Fast and successful synchronization of messages is vital for high performance systems such as network devices that include network processors. Network processors typically include multiple microengines, and often a core processor to manage the microengines. Often these microengines share work on a common task and are required to pass messages between the microengines.

Some network processors include a type of register that is known as a self-destruct register. A read from the register returns the current register state (all bits that were set following the last read operation to the register or after a reset) and atomically clears the register.

DESCRIPTION OF DRAWINGS

FIG. 2 is a block diagram of a microengine used in the network processor of FIG. 1.

DETAILED DESCRIPTION

Figure 1:
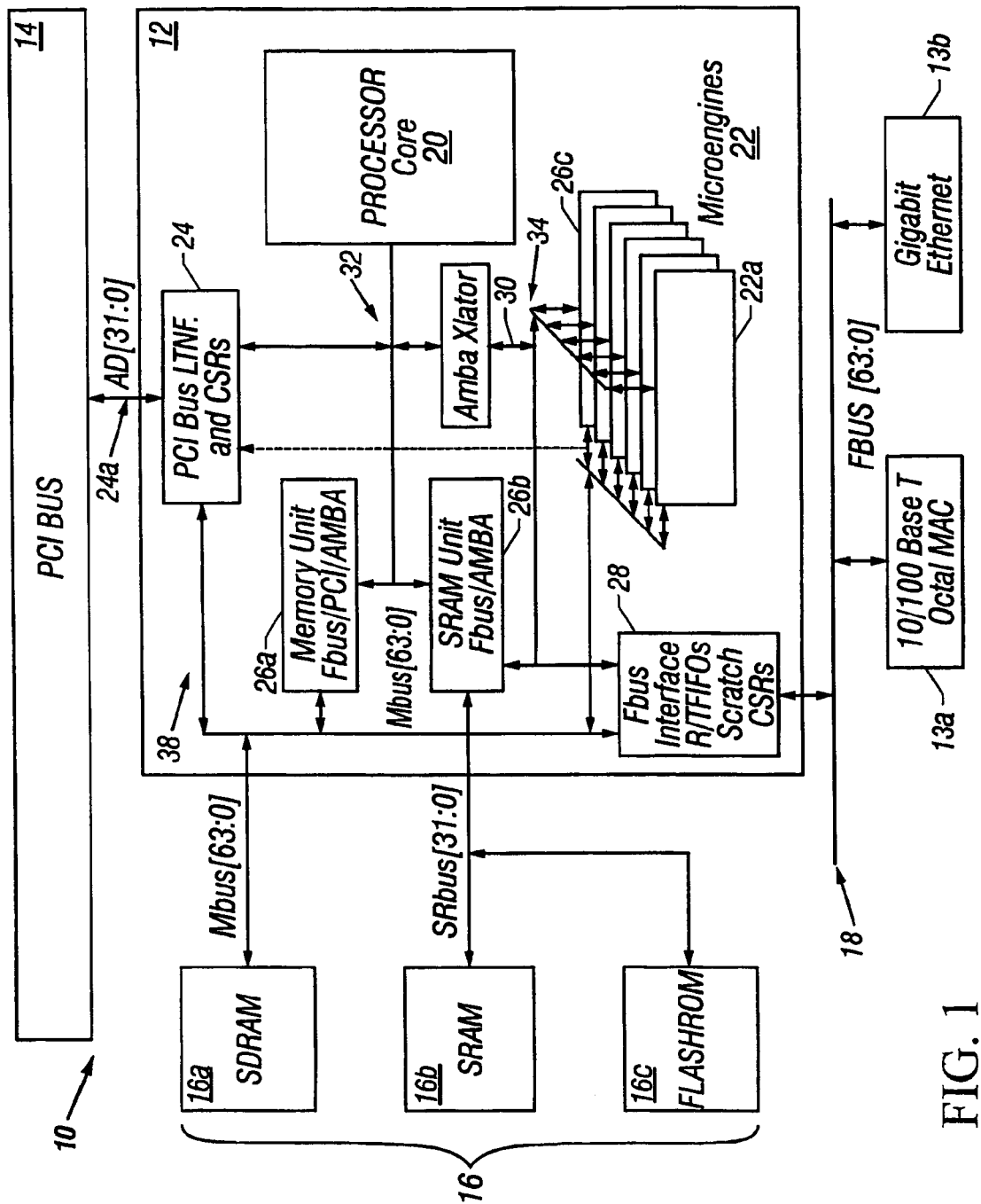
FIG. 1 is a block diagram of a network processor.
Figure 2A:
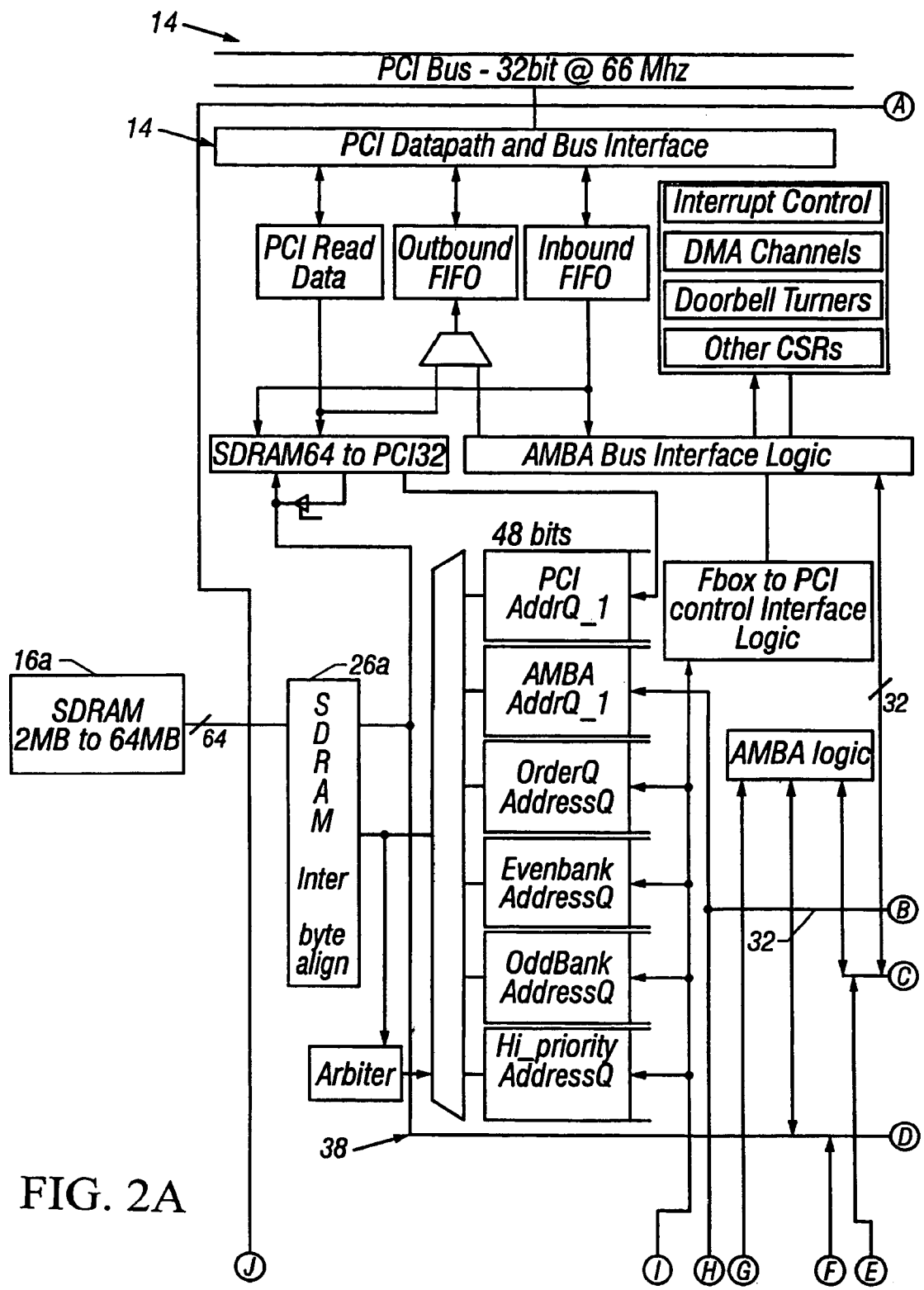
FIGS. 2-A to 2-D hereinafter
Figure 2B:
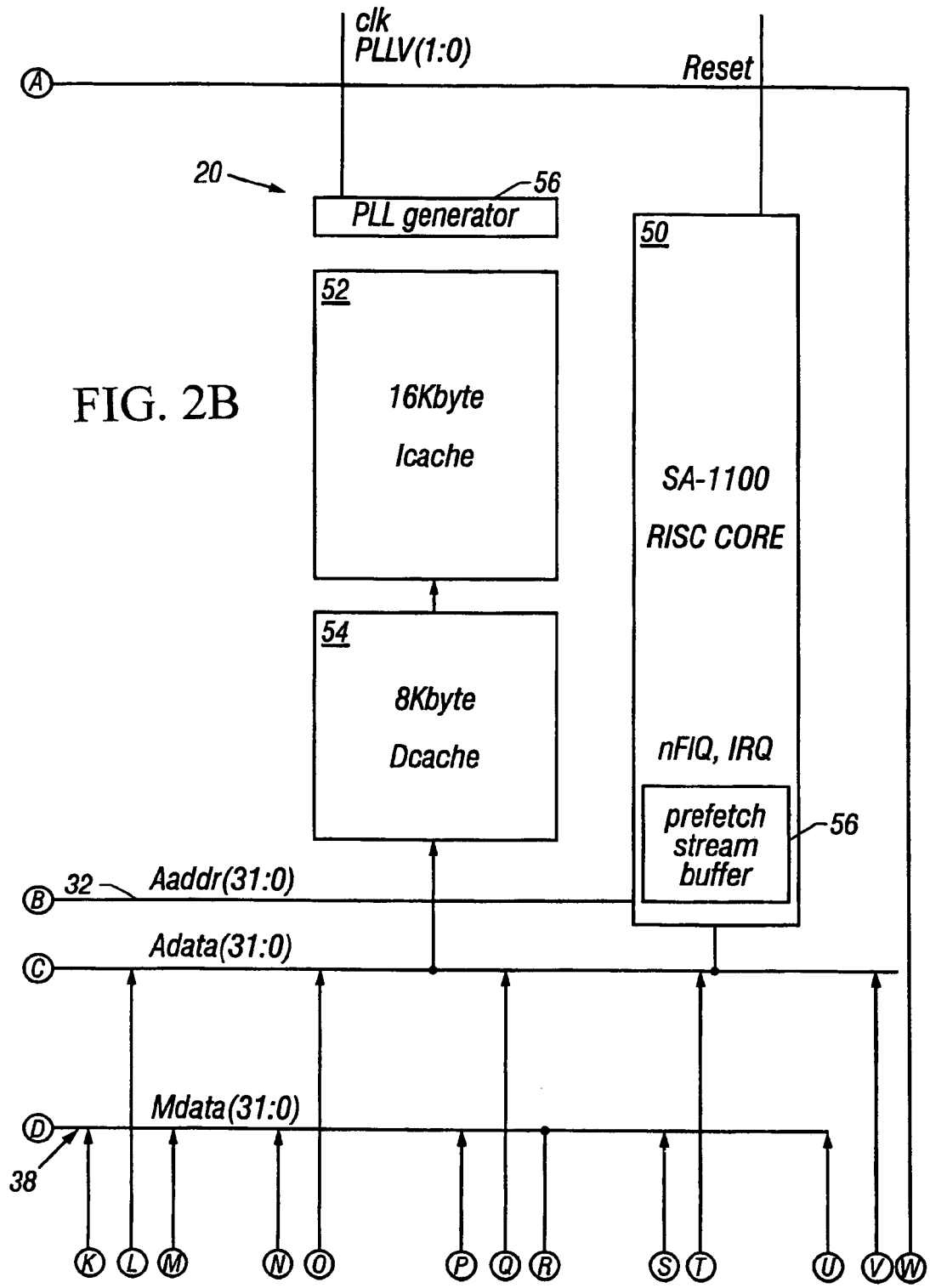
Figure 2C:
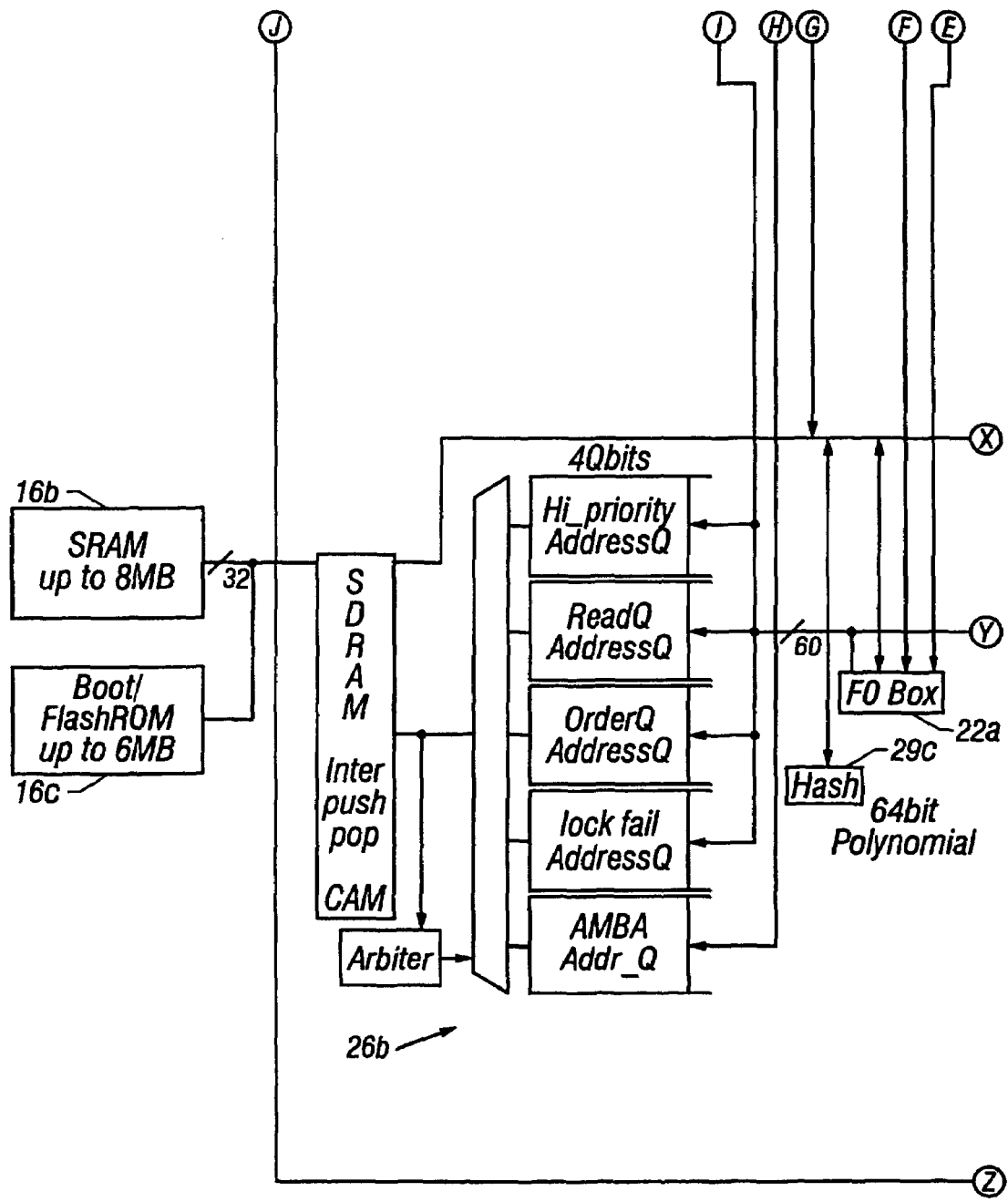
Figure 2D:
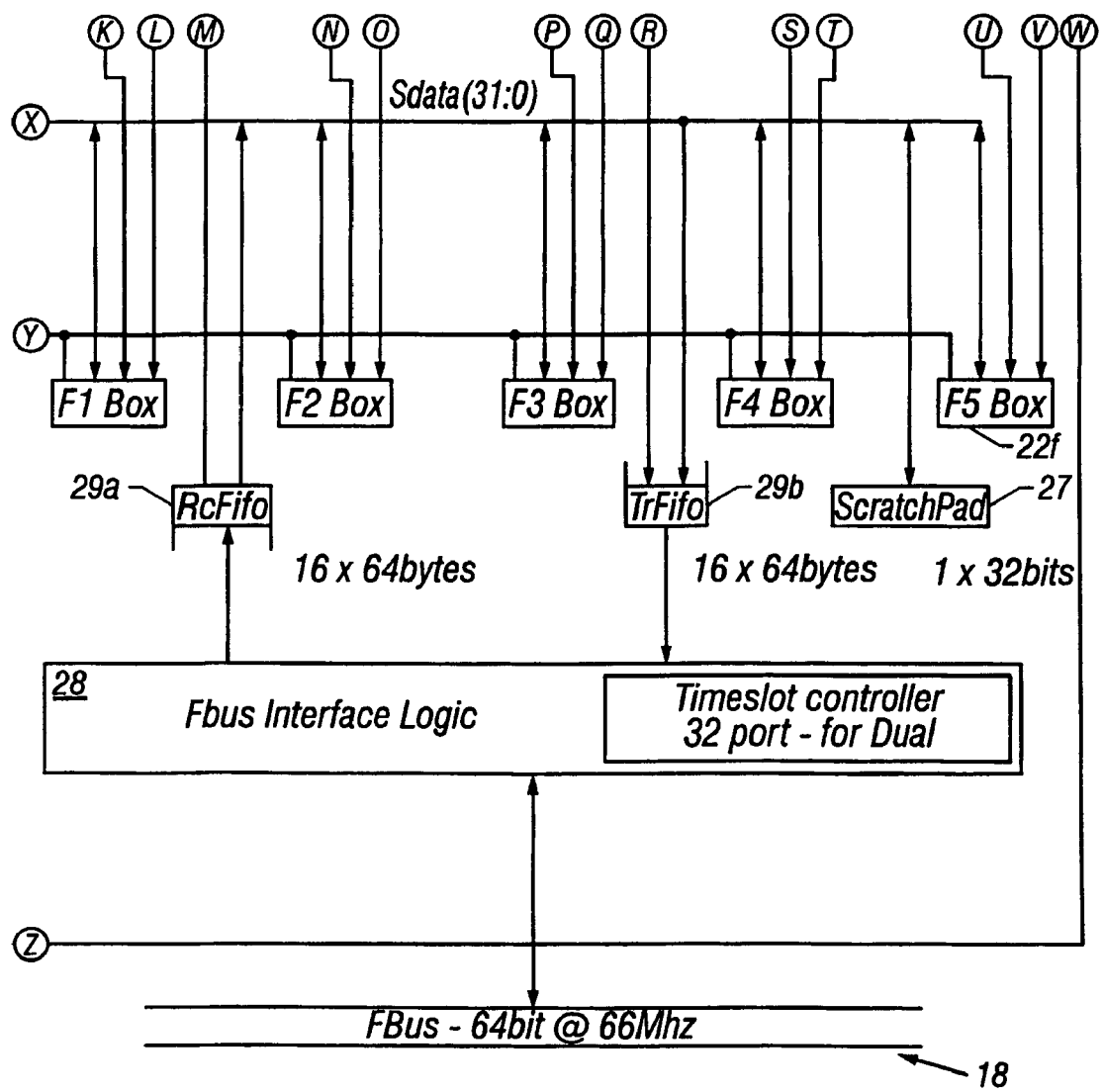

Referring to FIG. 1, a communication system 10 includes a parallel, hardware-based multithreaded processor 12. The hardware-based multithreaded processor 12 is coupled to a bus such as a PCI bus 14, a memory system 16 and a second bus 18. The system 10 is especially useful for tasks that can be broken into parallel subtasks or functions. Specifically hardware-based multithreaded processor 12 is useful for tasks that are bandwidth oriented rather than latency oriented. The hardware-based multithreaded processor 12 has multiple microengines 22 each with multiple hardware controlled threads that can be simultaneously active and independently work on a task.

The hardware-based multithreaded processor 12 also includes a central controller 20 that assists in loading microcode control for other resources of the hardware-based multithreaded processor 12 and performs other general-purpose computer type functions such as handling protocols, exceptions, and extra support for packet processing where the microengines pass the packets off for more detailed processing such as in boundary conditions. In one embodiment, the processor 20 is a Strong Arm® (Arm is a trademark of ARM Limited, United Kingdom) based architecture. The general-purpose microprocessor 20 has an operating system. Through the operating system the processor 20 can call functions to operate on microengines 22a-22f. The processor 20 can use any supported operating system preferably a real time operating system. For the core processor implemented as Strong Arm architecture, operating systems such as, MicrosoftNT Real-Time, VXWorks and μCUS, a freeware operating system available over the Internet, can be used.

The hardware-based multithreaded processor 12 also includes a plurality of function microengines 22a-22f. Functional microengines (microengines) 22a-22f each maintain a plurality of program counters in hardware and states associated with the program counters. Effectively, a corresponding plurality of sets of threads can be simultaneously active on each of the microengines 22a-22f while only one is actually operating at any one time.

In one embodiment, there are six microengines 22a-22f as shown. Other embodiments have more than or less than six microengines. Each of the microengines 22a-22f has capabilities for processing multiple hardware threads. The six microengines 22a-22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

The six microengines 22a-22f access either the SDRAM 16a or SRAM 16b based on characteristics of the data. Thus, low latency, low bandwidth data is stored in and fetched from SRAM, whereas higher bandwidth data for which latency is not as important, is stored in and fetched from SDRAM. The microengines 22a-22f can execute memory reference instructions to either the SDRAM controller 26a or SRAM controller 16b.

One example of an application for the hardware-based multithreaded processor 12 is as a network processor. As a network processor, the hardware-based multithreaded processor 12 interfaces to network devices such as a media access controller device e.g., a 10/100 BaseT Octal MAC 13a or a Gigabit Ethernet device 13b. As a network processor, the hardware-based multithreaded processor 12 can interface to any type of communication device or interface that receives or sends large amounts of data. Communication system 10 functioning in a networking application could receive a plurality of network packets from the devices 13a, 13b and process those packets in a parallel manner. With the hardware-based multithreaded processor 12, each network packet can be independently processed.

In the arrangement shown in FIG. 1, the network processor is part of a network router, but could also be used in a network interface device, switch, and other types of applications. Another example for use of processor 12 is a print engine for a postscript processor or as a processor for a storage subsystem, i.e., RAID disk storage. A further use is as a matching engine. In the securities industry for example, the advent of electronic trading requires the use of electronic matching engines to match orders between buyers and sellers. These and other parallel types of tasks can be accomplished on the system 10.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 12 to the FBUS 18. The FBUS 18 is a 64-bit wide FIFO bus, used to interface to Media Access Controller (MAC) devices.

The processor 12 includes a second interface e.g., a PCI bus interface 24 that couples other system components that reside on the PCI 14 bus to the processor 12. The PCI bus interface 24, provides a high-speed data path 24a to memory 16, e.g., the SDRAM memory 16a. Through that path data can be moved quickly from the SDRAM 16a through the PCI bus 14, via direct memory access (DMA) transfers. The hardware based multithreaded processor 12 supports image transfers. The hardware based multithreaded processor 12 can employ a plurality of DMA channels so if one target of a DMA transfer is busy, another one of the DMA channels can take over the PCI bus to deliver information to another target to maintain high processor 12 efficiency. Additionally, the PCI bus interface 24 supports target and master operations. Target operations are operations where slave devices on bus 14 access SDRAMs through reads and writes that are serviced as a slave to target operation. In master operations, the processor core 20 sends data directly to or receives data directly from the PCI interface 24.

Each of the functional units are coupled to one or more internal buses. As described below, the internal buses are dual, 32 bit buses (i.e., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB bus (Advanced System Bus) that couples the processor core 20 to the memory controller 26a, 26c and to an ASB translator 30 described below. The ASB bus is a subset of the so-called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Referring to FIG. 2, each of the microengines 22a-22f includes an arbiter that examines flags to determine the available threads to be operated upon. Any thread from any of the microengines 22a-22f can access the SDRAM controller 26a, SDRAM controller 26b or FBUS interface 28. The memory controllers 26a and 26b each include a plurality of queues to store outstanding memory reference requests. The queues either maintain order of memory references or arrange memory references to optimize memory bandwidth. For example, if a thread_0 has no dependencies or relationship to a thread_1, there is no reason that threads 1 and 0 cannot complete their memory references to the SRAM unit out of order. The microengines 22a-22f issue memory reference requests to the memory controllers 26a and 26b. The microengines 22a-22f flood the memory subsystems 26a and 26b with enough memory reference operations such that the memory subsystems 26a and 26b become the bottleneck for processor 12 operation.

Data functions are distributed amongst the microengines. The data buses, e.g., ASB bus 30, SRAM bus 34 and SDRAM bus 38 coupling shared resources, e.g., memory controllers 26a and 26b are of sufficient bandwidth such that there are no internal bottlenecks. As an example, the SDRAM can run a 64 bit wide bus. The SRAM data bus could have separate read and write buses, e.g., could be a read bus of 32 bits wide running at 166 MHz and a write bus of 32 bits wide at 166 MHz.

The core processor 20 also can access the shared resources. The core processor 20 has a direct communication to the SDRAM controller 26a to the bus interface 24 and to SRAM controller 26b via bus 32. However, to access the microengines 22a-22f and transfer registers located at any of the microengines 22a-22f, the core processor 20 access the microengines 22a-22f via the ASB Translator 30 over bus 34. The ASB translator 30 can physically reside in the FBUS interface 28, but logically is distinct. The ASB Translator 30 performs an address translation between FBUS microengine transfer register locations and core processor addresses (i.e., ASB bus) so that the core processor 20 can access registers belonging to the microengines 22a-22c.

Although microengines 22 can use the register set to exchange data as described below, a scratchpad memory 27 is also provided to permit microengines to write data out to the memory for other microengines to read. The scratchpad 27 is coupled to bus 34.

The processor core 20 includes a RISC core 50 implemented in a five stage pipeline performing a single cycle shift of one operand or two operands in a single cycle, provides multiplication support and 32 bit barrel shift support. This RISC core 50 is a standard StrongArm® architecture but it is implemented with a five stage pipeline for performance reasons. The processor core 20 also includes a 16 kilobyte instruction cache 52, an 8 kilobyte data cache 54 and a prefetch stream buffer 56. The core processor 20 performs arithmetic operations in parallel with memory writes and instruction fetches. The core processor 20 interfaces with other functional units via the ARM defined ASB bus. The ASB bus is a 32-bit bi-directional bus 32.

Figure 3:
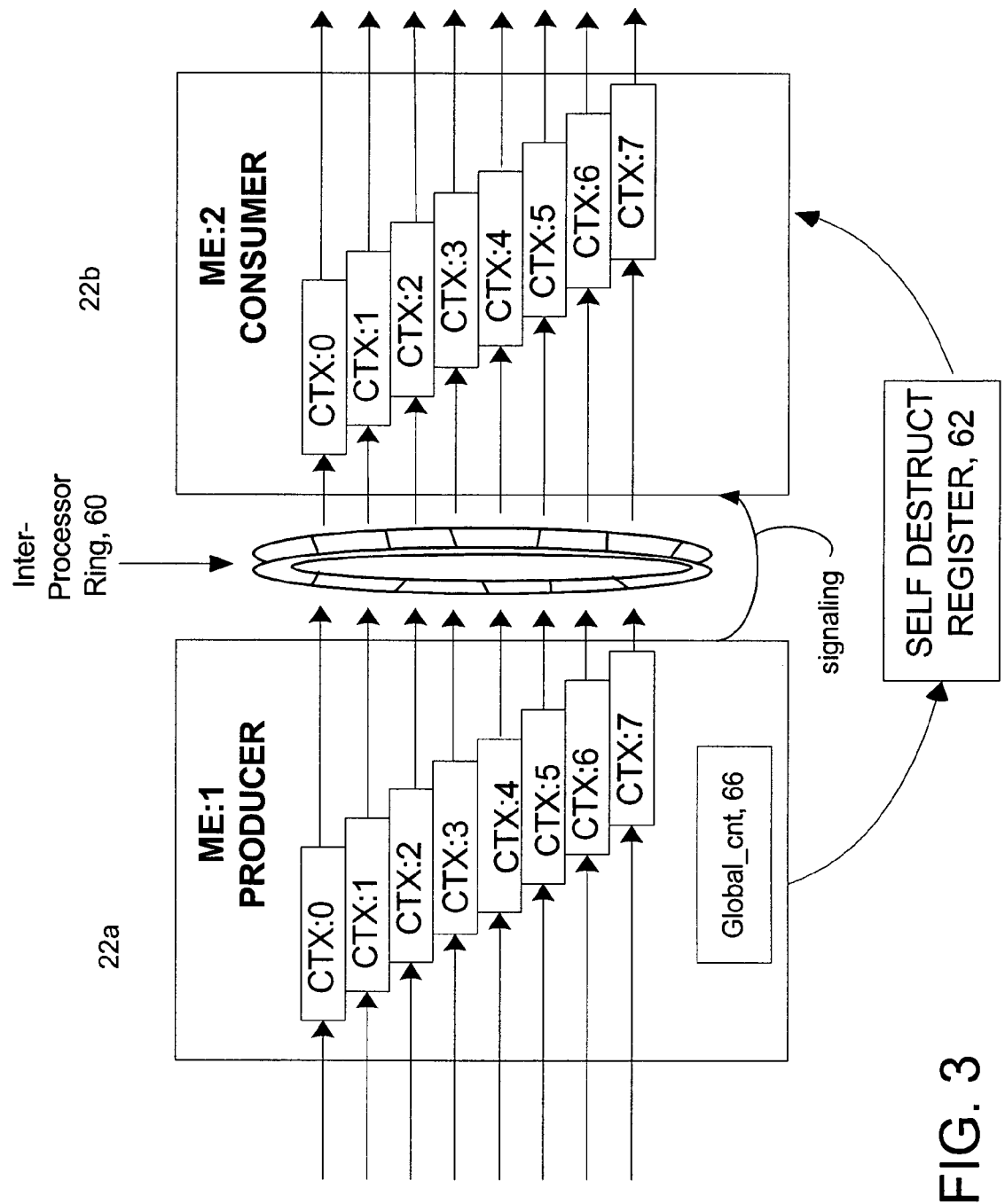
FIG. 3 is a block diagram of showing message passing between microengines.

Referring to FIG. 3, two microengines 22a, 22b of the microengines 22a-22f in the processor 12 hereinafter "network processor" are shown. One of the microengines 22a is a producer microengine whereas the other 22b is a consumer microengine. The producer microengine 22a processes packets and provides results of the processing that will be used by the consumer microengine 22b. The producer microengine has a plurality of contexts (threads of executing instructions). Disposed between the producer microengine 22a and the consumer microengine 22b is an inter-processor ring structure 60. The inter-processor ring structure 60 is a memory structure or ring that can be in SRAM, SDRAM, scratchpad or a microengine next neighbor register array.

When the producer processor 22a has a message that it needs to be placed on the inter-processor ring 60, it will place the data on the ring 60 and set a bit in a self-destruct register 62. The bit location in the self-destruct register 62 is determined by using a counter on the producing microengine that will start at, e.g., bit 0 and cycle through all bit positions in the self-destruct register 62, e.g., 32 bit positions, before continuing again with the first bit (i.e. bit 0). The counter that the producer uses to select the next bit to set in the self-destruct register is global to all threads on the producer microengine 22a that place data on the inter-processor ring. The self-destruct register 62 enables synchronization between the microengines 22a-22b. The self-destruct register and inter-processor ring 60 allows up to a maximum of, e.g., 32 outstanding messages before the producing microengine temporarily stops sending data to the ring 60 to permit the consumer microengine to empty some of the ring's 60 contents.

This storage capacity provided by the inter-processor ring 60 is more than adequate in most situations. For example in the case of next neighbor rings, the number of long words that the ring can hold is 128. If the number of long words in a message is 4 or more, then the next neighbor ring will fill up before the 32-bit self-destruct register window overflows. If the message is less than 4 longwords, then two self-destruct registers can be used for synchronization. A counter "global_cnt" 66 is used by the producer microengine to select the next bit to set in the self-destruct register 62. Counter global_cnt 66 is an absolute register in the producer microengine. It could be located in memory (i.e. local memory, scratch, SRAM or DRAM). Counter global_cnt 66 is global to all threads on the producer microengine that place data on the inter-processor ring.

The self-destruct register 62 is used for synchronizing data passed between microengines. During a write operation, a bit in the 32-bit register is ORed with the existing 32 bits. This operation is atomic so multiple producers can write to the register without causing race conditions. A read from the register returns the current register state (all bits that were set following the last read operation to the register or after a reset) and atomically clears the register.

be processed off of the inter-processor ring 60. The self-destruct register synchronizes data that is passed between the producer and consumer microengines 22a, 22b.

The Table below is an example communication stream that could occur between a producer 22a (ME:1) and a consumer 22b (ME:2) processor. In the example, the producer 22a writes five messages to the inter-processor ring 60. The consumer 22b independently reads the self-destruct register 62 twice to retrieve all five messages.

TABLE

| Time (in steps) | ME:1 (Producer) | ME:2 (Consumer) | Self-Destruct Register Value after Operation | Comments |
|---|---|---|---|---|
| 0 | CTX0 places data on inter-processor ring and writes 0 x 01 to the self-destruct register. | | 0 x 01 | Bit 0 is set in self-destruct register |
| 1 | CTX1 places data on inter-processor ring and writes 0 x 02 to the self-destruct register. | | 0 x 03 | Bits 0 and 1 are set in self-destruct register |
| 2 | CTX2 places data on inter-processor ring and writes 0 x 04 to the self-destruct register. | | 0 x 07 | Bits 0, 1 and 2 are set in self-destruct register |
| 3 | | CTX0 the reads a value of 0 x 07 from the self-destruct register | 0 x 00 | When ME:2 reads the self-destruct register, it is reset to 0. Since 3 bits were set, it will take 3 messages from the inter-processor ring. |
| 4 | CTX3 places data on inter-processor ring and writes 0 x 08 to the self-destruct register. | | 0 x 08 | Bit 4 is set in the self-destruct register |
| 5 | CTX4 places data on inter-processor ring and writes 0 x 18 to the self-destruct register. | | 0 x 18 | Bits 4 and 5 are set in the self-destruct register |
| 6 | | CTX1 the reads a value of 0 x 18 from the self-destruct register | 0 x 00 | When ME:2 reads the self-destruct register, it is reset to 0. Since 2 bits were set, it will take 2 messages from the inter-processor ring. |

The consumer processor 22b checks the self-destruct register to determine the number of messages to read from the inter-processor ring. The consumer processor 22 uses a Find First bit Set (FFS) microinstruction with the self-destruct register to immediately determine if the ring needs processing. The FFS microinstruction locates the first bit set in a register. If a bit is set, it will return the bit position in an output register otherwise it will set the 'Z' flag in the network processor. It is not necessary to use the FFS instruction. Any instruction or combinations of instructions that can determine if a bit is set will work as well. Other arrangements are possible. If the self-destruct register returns a value of 0, then no message is in the inter-processor ring 60. In order to minimize the need for polling of the self-destruct register 62, signaling by the producer thread could be used. In this embodiment, producer microengine 22a will signal consumer microengine 22b when producer microengine 22a places data on the inter-processor ring. Consumer microengine 22b will check the inter-processor ring if it receives a signal that indicates that at least one message is waiting in the ring. Once the signal is received, consumer microengine 22b will check the self-destruct register to determine the number of messages waiting on the ring.

Figure 4:
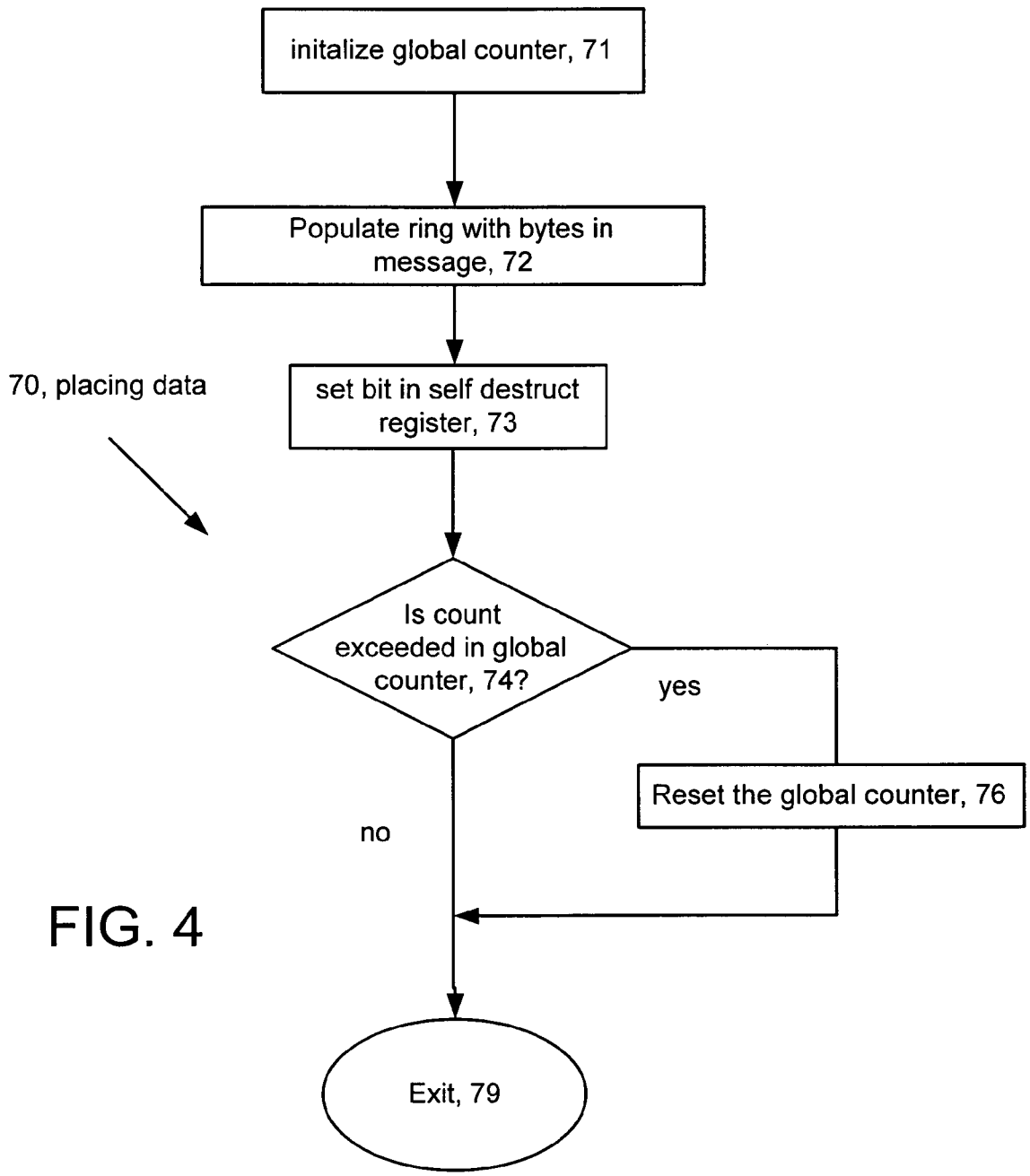
FIGS. 4-7 are flow charts depicting aspect of message synchronization.

Using the self-destruct register 62, the thread can quickly determine the number of outstanding messages that need to Referring to FIG. 4, a process 70 to place data from a producer microengine 22a onto the inter-processor ring 60 without using signaling is shown. During initialization 71, global_cnt register 66 on the producer microengine, e.g., microengine 22a is set to point to bit 0 in the self-destruct register 62. This initialization is performed typically once, such as when the processor is powered on, or reset.

The process 70 populates 72 the ring with all bytes in the message from the producer microengine, sets 73 the bit in the self-destruct register corresponding to the bit in the global_cnt and checks 74 if global_cnt exceeds the maximum number of bits in the self-destruct register, e.g., 32. If the count is met, the process 70 resets 76 the global_cnt to bit 0 and exits 79. Otherwise, the process 70 exits 79 and a new instance of the process 70 will place additional data on the inter-processor ring from subsequent producers and set the next available bit position.

It is also possible to use a signal in conjunction with the self-destruct register to avoid excessive use of the bus when the producer microengine polls the self-destruct register to determine if any data is available to be read off the ring.

Figure 5:
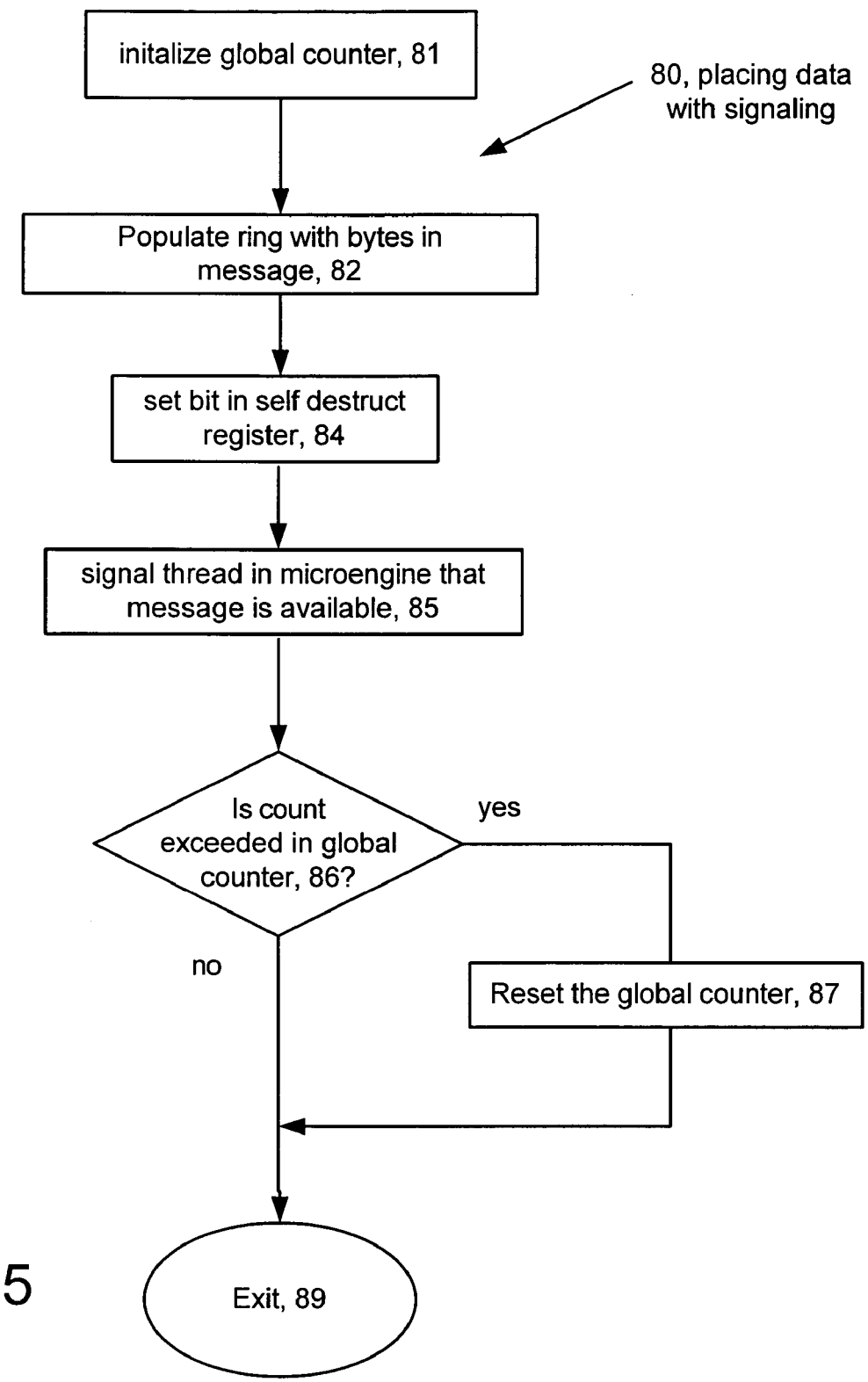

Referring to FIG. 5, a process 80 to place data on inter-processor ring (in conjunction with signals) is shown. Process 80 has an initialization 81, in which the global_cnt register 66 is set to point to bit 0. Process 80 populates 82 the inter-processor ring 60 with all bytes in the message from the producer microengine, sets 84 the bit in the self-destruct register corresponding to the bit in the global_cnt, and signals 85 a thread in the processing microengine that a message is available to be read. The process checks 86 if global_cnt exceeds the maximum number of bits in the self-destruct register, e.g., 32. If the count is met, the process 80 resets 87 global_cnt to bit 0 and exits. Otherwise the process 80 exits 89 and a new instance of the process 80 will place additional data on the inter-processor ring from subsequent producers, and set the next available bit position.

The consumer microengine, e.g., microengine 22b will either use the inter-microengine signal to poll the self-destruct register or periodically choose to poll the self-destruct register to determine if a message or multiple messages need to be read from the ring.

Figure 6:
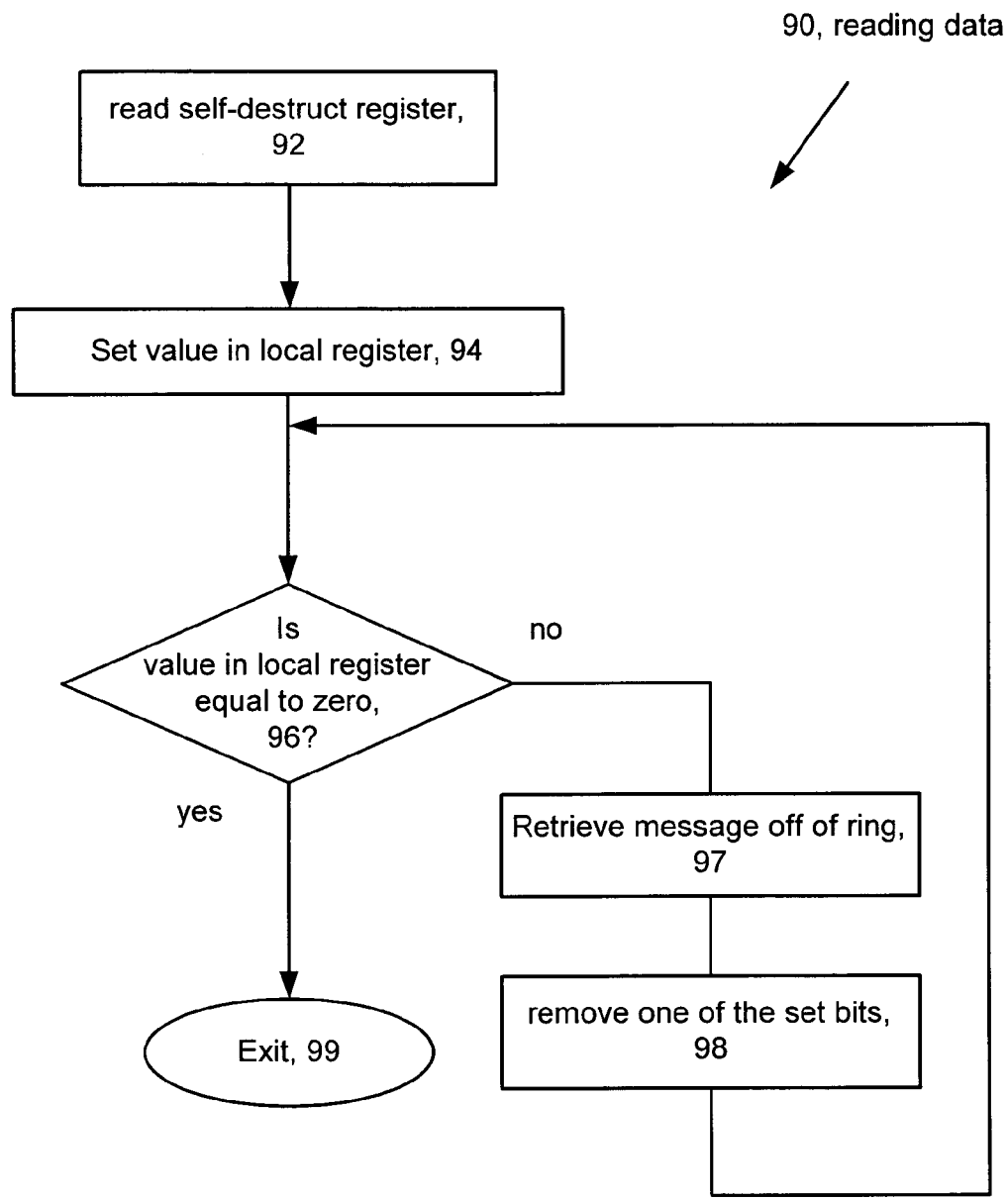

Referring to FIG. 6, a process 90 to read data off the inter-processor ring without the use of signaling is shown. The process 90 reads 92 the self-destruct register and sets 94 a value in a local register. This register can be either global to all threads executing on the microengine or it can be local to the thread that performed the read operation. The reason that the contents from the self-destruct register are maintained in a local register is because the self-destruct register is reset to zero when the data is read. If the data were not kept locally, it would be lost. The process 90 checks 96 the value in the local register, and if the value in the local register equals zero then the process 90 exits 99. Otherwise, the process 90 retrieves 97 a message off of the inter-processor ring, removes 98 one of the set bits from the local register and returns to check 96 the value in the local register. The process 90 continues to process available messages and exits 99 when the value in the local register equals zero.

Figure 7:
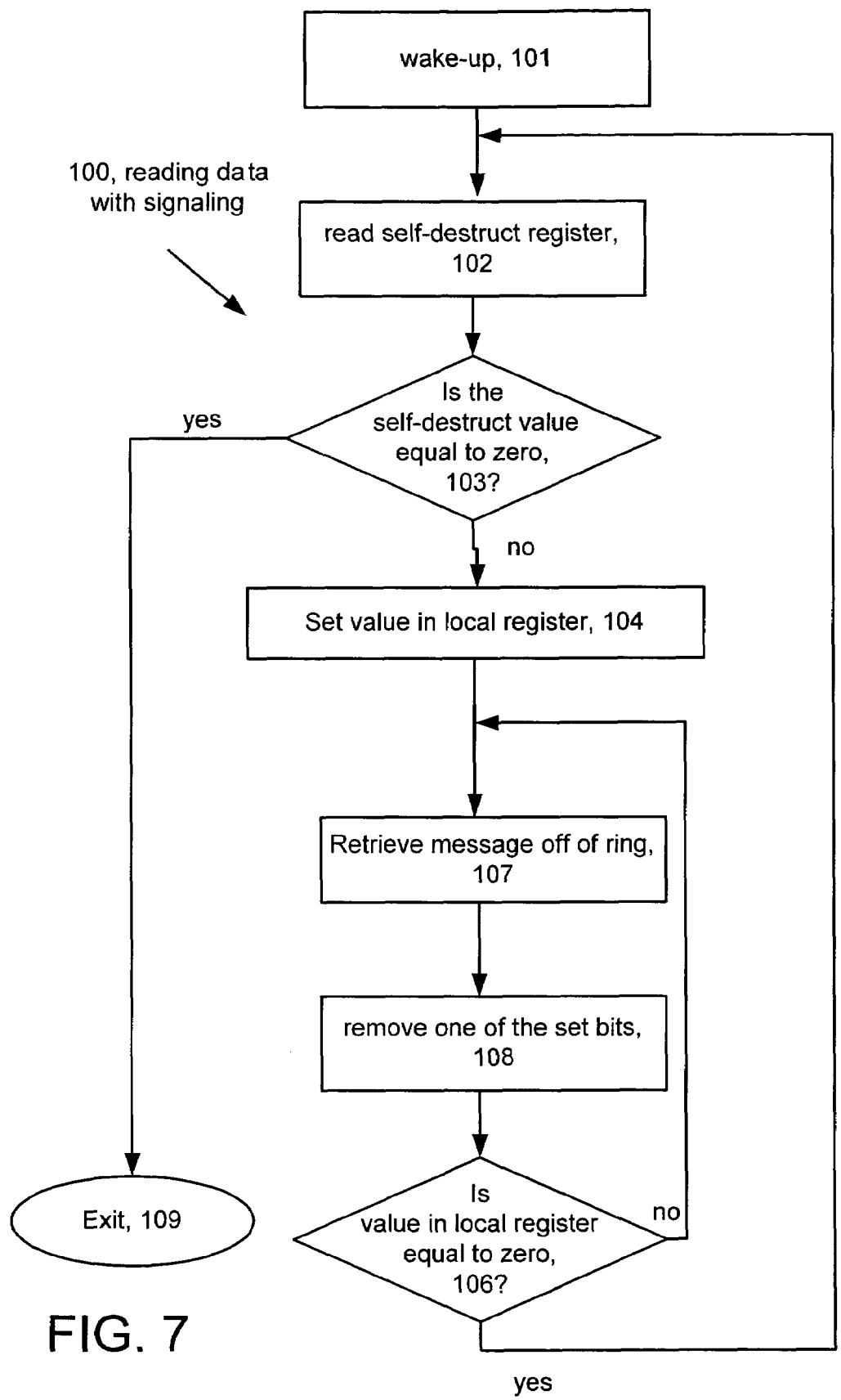

If the solution requires the use of the inter-microengine signals, then the consumer microengine will change to the following:

Referring to FIG. 7, a process 100 to read data off the inter-processor ring in conjunction with signaling is shown. The process 100 wakeups 101 when the signal sent from the producer microengine 22a is received. The process 100 reads 102 the self-destruct register. The process 100 then determines 103 if any bits are set in the self-destruct register (i.e. using the FFS micro instruction). If no bits are set, it immediately exit 109 otherwise the process 100 sets 104 the value in a local register. The process retrieves a message off the ring 107. It clears one bit from the local register 108. The process could retrieve multiple messages simultaneously. It will clear the number of bits equal to the number of messages read off the ring. The process checks 106 the value in the local register and if the local register value equals zero then the process goes to 102 to check if any more messages were placed on the ring while the process read messages off the ring. Otherwise, the process 100 returns to 107 to continue processing messages.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
   passing data from a producer processor to an inter-processor ring structure, and setting a bit in a self-destruct register;

reading the self-destruct register by a consumer processor to determine the number of bytes of data to read from the inter-processor ring, while clearing the self-destruct register; and removing from the ring, data passed to the ring from the producer processor, with the amount of data removed from the ring corresponding to a number of bits set in the self-destruct register.

2. The method of claim 1 wherein the inter-processor ring structure resides in memory.

3. The method of claim 1 wherein the producer processor data are messages that it places on the inter-processor ring.

4. The method of claim 1 wherein the bit location in the register is determined by using a counter on the producer processor.

5. The method of claim 1 wherein the counter that the producer uses to select the next bit to set in the self-destruct register is global to all threads on the producer processor that place data on the inter-processor ring.

6. The method of claim 1 wherein the self-destruct register enables synchronization between the producer and consumer processors for data passing through the inter-processor ring.

7. The method of claim 1 wherein the self-destruct register during a write operation of a bit in the bit register is logically "Ored" with existing bits in the self-destruct register in an atomic operation.

8. The method of claim 1 wherein a read operation from the register returns the current state of the register and atomically clears the register.

9. The method of claim 8 wherein the current state of the register is all bits set following the last read operation to the register or after a reset.

10. The method of claim 1 wherein the consumer processor uses a Find First bit Set (FFS) microinstruction with the self-destruct register to immediately determine if the ring needs processing.

11. The method of claim 1 further comprising:
    signaling by a producer thread in the producer microengine to a consumer microengine when the producer microengine places data on the inter-processor ring.

12. The method of claim 11 further comprising:
    checking the inter-processor ring by the consumer processor if the consumer processor receives a signal that indicates that at least one message is waiting in the ring; and
    checking the self-destruct register once the signal is received by the consumer processor to determine the number of messages waiting on the ring.

13. The method of claim 1 wherein the producer processor and the consumer processor are micro-engines on a network processor device.

14. A method to read data off of an inter-processor ring comprises:
    waking up a thread when a signal sent from a producer is set;
    reading a self-destruct register;
    setting a value in a local register;
    checking the value in the local register and if the local register value indicates that data are available,
    processing data off of the inter-processor ring; and
    removing one of the set bits from the local register.

15. The method of claim 14 wherein if the value indicates that data are not available the process exits.

16. The method of claim 14 wherein the counter that the producer uses to select the next bit to set in the self-destruct register is global to all threads on the producer processor that place data on the inter-processor ring.

17. The method of claim 14 wherein self-destruct register enables synchronization between the producer and consumer processors for data passing through the inter-processor ring.

18. A system, comprising:
an inter-processor ring;
a producer processor that passes data to the inter-processor ring, while setting a bit in a self-destruct register;
a consumer processor to read the self-destruct register to determine the number of bytes of the data to read from the inter-processor ring and clearing the self-destruct register to remove from the ring, data passed to the ring from the producer processor, with the amount of data removed from the ring corresponding to a number of bits set in the self-destruct register.

19. The system of claim 18 wherein the inter-processor ring structure is memory ring.

20. The system of claim 18 wherein the producer processor data are messages that it places on the inter-processor ring.

21. The system of claim 18 wherein the bit location in the register determined by using a counter on the producer processor.

22. The system of claim 18 wherein the counter that the producer uses to select the next bit to set in the self-destruct register is global to all threads on the producer processor that place data on the inter-processor ring.

23. The system of claim 18 wherein the self-destruct register enables synchronization between the producer and consumer processors for data passing through the inter-processor ring.

24. The system of claim 18 wherein the self-destruct register during a write operation of a bit in the bit register is logically "Ored" with existing bits in the self-destruct register in an atomic operation.

25. The system of claim 24 wherein a read operation from the register returns the current state of the register and atomically clears the register.

26. The system of claim 18 wherein the consumer processor uses a Find First bit Set (FFS) microinstruction with the self-destruct register to immediately determine if the ring needs processing.

27. The system of claim 18 wherein the producer thread in the producer microengine signals a consumer microengine when the producer microengine places data on the inter-processor ring.

28. A system comprising:
an inter-processor ring;
a global_cnt register;
a producer processor passing data to the inter-processor ring structure to populate the ring with bytes in a message, while setting a bit in the global_cnt register;
a self-destruct register having a bit position that is set corresponding to the bit in the global_cnt register; and
a consumer processing microengine that is signaled by a thread in the producer microengine that a message is available to be read, the consumer processing microengine reading the self-destruct register by a consumer processor to determine and remove the number of bytes of data to read from the inter-processor ring while clearing the self-destruct register.

29. The system of claim 28 wherein the global_cnt is checked to determine if the value in the register exceeds a maximum number of bits in the self-destruct register, and if the count is exceeded, the global_cnt is reset to bit 0.

30. A system comprises:
a network processor having at least a producer microengine and a consumer microengine, a self-destruct register and a local register;
an inter-processor ring structure accessible by the network processor;
the network processor; and
a computer readable medium for storing instructions causing a consumer microengine to:
read the self-destruct register to determine the number of bytes of data to read and remove from the inter-processor ring and set a value in a local register while clearing the self-destruct register,
check the value in the local register and if the local register value indicates that messages are available,
process data off of the inter-processor ring, and
remove one of the set bits from the local register;
a media access controller device to send packets to and from the network processor.

31. The system of claim 30 wherein the media access controller device is a 10/100 BaseT Octal media access controller.

32. The system of claim 30 wherein the media access controller device is a Gigabit Ethernet device.

33. The system of claim 30 wherein the register that a producer processor uses to select the next bit to set in the self-destruct register is global to all threads on the producer processor that place data on the inter-processor ring.

34. The system of claim 30 wherein the system is a router.

35. A computer program product residing on a computer readable medium for synchronizing messaging between a pair of processing engines, comprises instructions for causing a processor to:
pass data from a producer processor to an inter-processor ring structure, while setting a bit in a self-destruct register;
read the register by a consumer processor to determine the number of bytes of data to read and remove from the inter-processor ring, while clearing the self-destruct register and removing from the ring, data passed to the ring from the producer processor, with the amount of data removed from the ring corresponding to a number of bits set in the self-destruct register.

36. The computer program product of claim 35 wherein the producer processor data are messages that it places on the inter-processor ring.

37. The computer program product of claim 35 wherein the bit location in the self-destruct register are determined by using a counter on the producer processor.

38. The computer program product of claim 35 wherein the counter that the producer processor uses to select the next bit to set in the self-destruct register is global to all threads on the producer processor that place data on the inter-processor ring.

39. The computer program product of claim 35 wherein the computer program executes an instruction in the consumer processor to determine if the ring needs processing.

40. The computer program product of claim 35 further comprising instructions to:
signal by the producer thread in the producer microengine of a consumer microengine when the producer microengine places data on the inter-processor ring.

41. The computer program product of claim 35 further comprising instructions to:
check the inter-processor ring by the consumer processor if by the consumer processor receives a signal that indicates that at least one message is waiting in the ring; and
checking the self-destruct register once the signal is received by the consumer processor to determine the number of messages waiting on the ring.

* * * * *